May 18, 1954 — R. F. ONSRUD — 2,678,487
FACE-MILLING CUTTER
Filed Sept. 2, 1950 — 2 Sheets-Sheet 1

INVENTOR:
RUDOLPH F. ONSRUD
BY
ATT'YS

May 18, 1954 — R. F. ONSRUD — 2,678,487
FACE-MILLING CUTTER
Filed Sept. 2, 1950 — 2 Sheets-Sheet 2

INVENTOR:
RUDOLPH F. ONSRUD
BY
Rummler, Rummler & Snow
ATT'YS

Patented May 18, 1954

2,678,487

UNITED STATES PATENT OFFICE 2,678,487

FACE-MILLING CUTTER

Rudolph F. Onsrud, Chicago, Ill., assignor to Onsrud Machine Works, Inc., Chicago, Ill., a corporation of Illinois Application September 2, 1950, Serial No. 182,913

6 Claims. (Cl. 29—105)

This invention relates to milling cutters and particularly to rotating milling cutters designed for high speed end milling operation; and this application is a continuation-in-part of my copending application Serial No. 7641 filed February 11, 1948, upon which Patent No. 2,524,232 was issued on October 3, 1950.

The main objects of this invention are to provide an improved rotary milling cutter; to provide an improved rotary end milling cutter that will produce a fine finish having a high degree of flatness; to provide an improved high speed rotary milling cutter having an improved arrangement of cutting blades; to provide such a device having an improved blade for making the finishing cut; to provide an improved mounting arrangement for a finish-cut blade in an end milling cutter; to provide an improved finish-cut blade construction; and to provide an improved face milling cutter blade wherein the cutting edge may be renewed without removing the blade from the cutter body.

A specific embodiment of this invention is shown in the accompanying drawings in which.

Figure 1:
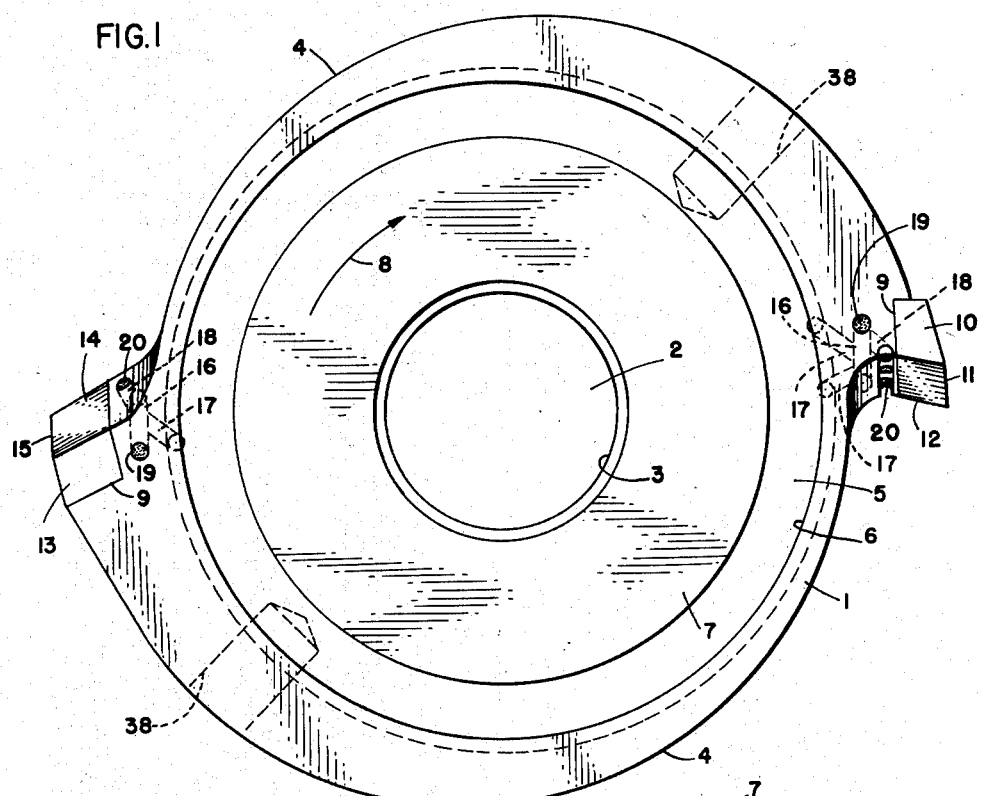
Figure 1 is a top plan view of the improved milling cutter.

In the form shown in the drawings, the improved milling cutter comprises a solid substantially annular or disc-like body 1 having a central opening or bore 2, internally threaded as at 3, for mounting on a cutter spindle and having a plurality of cutter blades mounted on its periphery. The body is arranged so that its greatest diameter is across opposing cutter blades and the radius of the periphery is gradually reduced between the cutter blades in the direction opposite the direction of rotation so that the outline of the cutter periphery from blade to blade follows a substantially involute path, as shown at 4 in Figs. 1 and 4.

Each face of the cutter body is provided with an annular channel 5, the outer wall of which is somewhat undercut outwardly to form an annular groove opening toward the body axis as at 6, and the upper side of the cutter body is provided with an annular shoulder or hub portion 7 which serves to space the cutter body from the end of the spindle on which it is mounted.

As shown in Fig. 1, the cutter blades are oppositely disposed on the periphery of the body 1, and are secured fast in square-sided seats 9 cut transversely in the periphery of the body. The cutter blades are also inclined downwardly in the direction of rotation of the cutter, the direction of rotation being indicated by the arrow 8 in Fig. 1.

Figure 2:
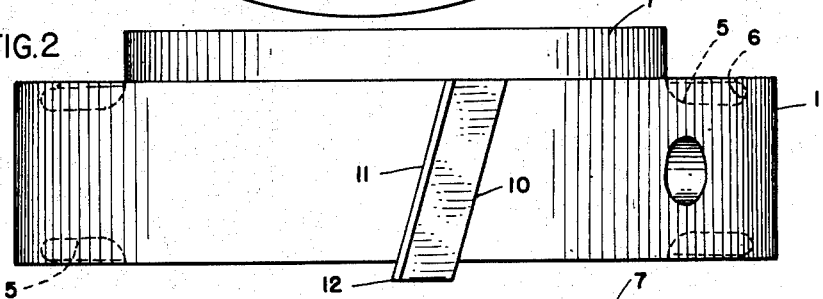
Fig. 2 is a side elevation of the same showing the arrangement of the radial cutting blade which performs a rough milling operation.

The principal cutting operation, whereby most of the metal to be milled is removed, is done by a radial cutter blade 10 made of tungsten carbide and secured fast in its seat 9 by hydrogen atmosphere copper brazing. The cutting edge 11 of this blade extends transversely of the body periphery substantially in the direction of the axis of the cutter body. The blade 10 also projects beyond the bottom or outer face of the cutter body as shown in Fig. 2 so that the cutter body will amply clear the surfaces of the work being milled, and the end cutting edge 12 is inclined rearwardly at an angle of about 10° from a plane through the cutter axis and the leading or lower tip of the cutting edge 11.

The opposite or fly cutting blade 13 is also made of tungsten carbide and is secured in its seat 9 by means of hydrogen atmosphere copper brazing. The function of this blade is to perform a face milling operation and its cutting edge is the bottom edge 14 which lies in a plane normal to the cutter axis. The outer edge 15 of the blade 13, which extends in the direction of the cutter axis, is arranged so that its radial distance from the body center line is less than the radial distance of the outer edge 11 of the opposite blade 10, the difference in the distances being approximately .030 inch.

The face milling edge 14 of the fly cutting blade 13 is inclined forwardly from its extremity, in the direction of rotation of the cutter, at an angle of about 30° relative to a plane including the axis of the cutter body and the outer extremity of the cutting edge 14. Also, the cutting edge 14 projects beyond the bottom or end of the cutter body 1 a distance slightly greater than the projection of the radial cutting blade 10, the difference being substantially .010 inch.

Thus, in operation of the cutter blades, the radial cutter blade 10 removes most of the material to be milled by a combined radial and face-milling operation but leaves a slight amount for a finish cut, and the fly cutter blade 13 makes the finish cut by a face milling operation. The preferred speed of the cutter is in the neighborhood of 5400 R. P. M., and a relatively high rate of cutter feed can thus be obtained and still accomplish a fine finish having an extremely high degree of flatness on the surface being milled. In practice a surface finish of micro inch RMS5 is obtained with a surface flatness approximating that of precision blocks.

As shown, lubrication for the cutting blades of the improved rotary cutter is had by delivering oil in small quantities to the leading faces of the cutter blades where, by centrifugal force the oil is spread across the faces to the cutting edges. Delivery of this lubricating oil is obtained through drilled passages leading from the peripheral surface of the cutter, adjacent the inner edge of the cutter blade faces, to the body end channels 5 where oil or other suitable lubricant is fed from a sight feed cup, not shown.

In the case of each cutter blade, the drilled passage is formed by first providing a bore 16 drilled through the body of the cutter adjacent its periphery, near the cutter blade and outside of the channels 5, in a direction parallel with the outer edge of the cutter blade. A diagonal passage 17 is then drilled from each of the channels 5 into the bore 16, the passages 17 sloping from the channels 5 toward the center of the peripheral surface of the cutter.

Finally, a plurality of axially spaced, substantially radial passages 18 are drilled from the peripheral surface of the cutter, adjacent the inner edge of the faces of the cutter blades, into the bore 16. The ends of the bore 16 are then closed by means of solid plugs 19 and the ends of the passages 18 at the peripheral surface of the cutter body are blocked by means of porous plugs 20 which are of a material that will allow the lubricant to seep through at the rate of only a few drops per minute under the pressure developed by the centrifugal force of rotation. The lubricant is thus distributed evenly over the faces of the cutter blades, so that the friction between the chips and the cutter blades is reduced, and to the cutting edges where the lubricant is most needed to minimize the heat generated by the cutting action.

Figure 4:
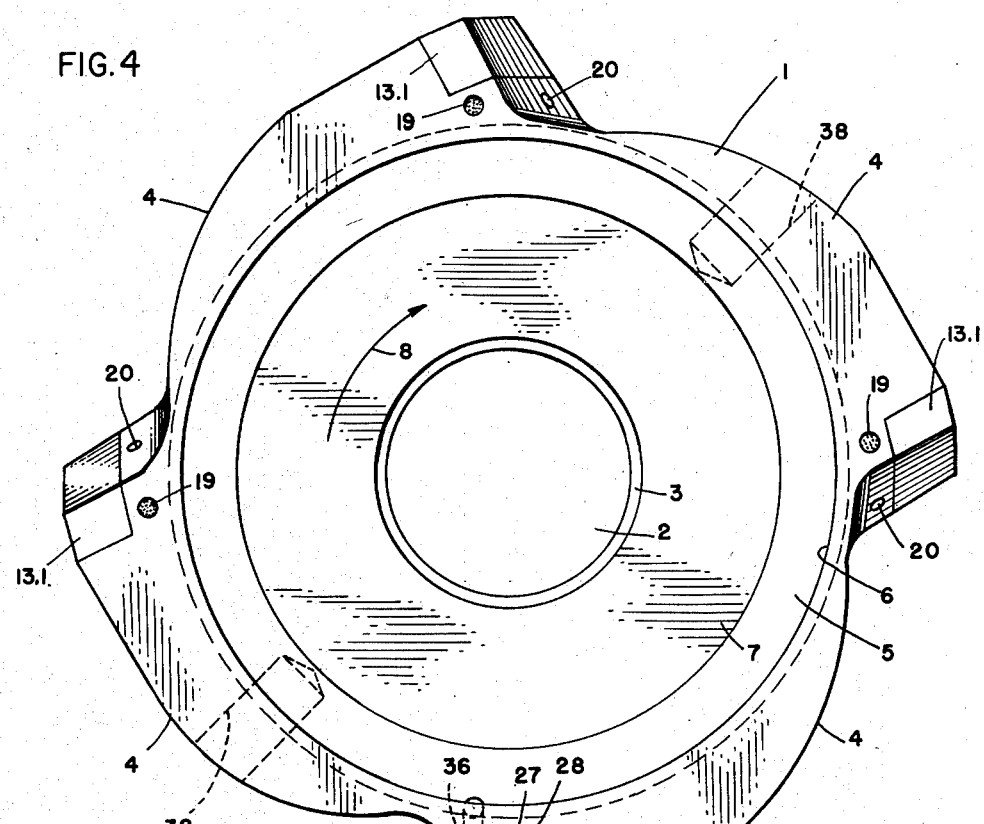
Fig. 4 is a top plan view of an improved face milling cutter having a special blade of improved construction for making an extra fine finishing cut.
Figure 5:
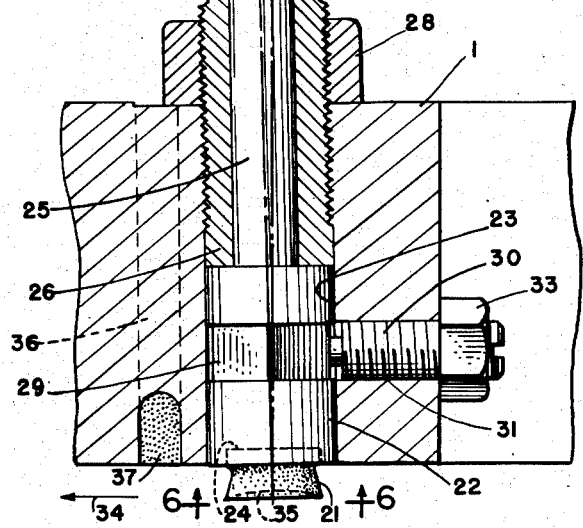
Fig. 5 is an enlarged fragmentary sectional detail, as taken on line 5—5 of Fig. 2, showing the improved finish-cut blade.

The improved construction shown in Figs. 4 and 5 is a face milling cutter, particularly adapted for high speed operation, and embodies an improved cutting blade for making a final cut that will leave fine finish of such perfect flatness that the milled surfaces of the two pieces may be wrung together, as in the case of precision gauge blocks.

Figure 3:
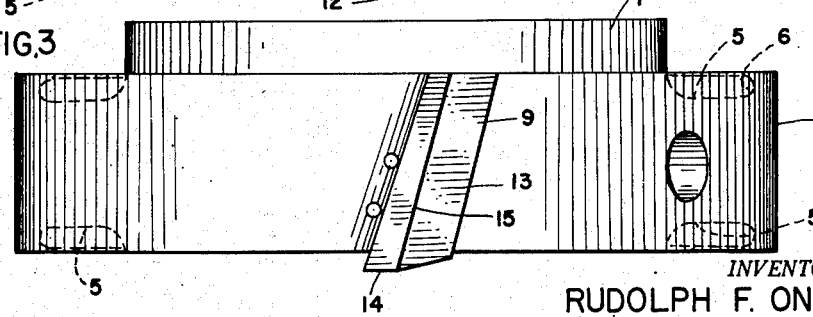
Fig. 3 is a side elevation of the same showing the arrangement of the fly cutter blade which performs a finish cut by a face milling operation.

In the form shown in Fig. 4, four cutting blades are provided on the cutter body, three of the blades being like fly cutters but capable of making the relatively heavy initial or roughing cut and the fourth blade being an adjustable cutter of generally cylindrical form for making the finish cut. The cutters 13.1 are similar to that shown in Figs. 1 and 3 and are spaced apart 90° on the periphery of the cutter body. The adjustable cutter blade is located in the fourth quadrant of the cutter body, diametrically opposite the second or middle cutter 13.1.

As shown in Fig. 5, the adjustable cutter blade extends through the cutter body in the axial direction and projects beyond the working face or end of the cutter body where the blade terminates in a tip 21 of tungsten carbide material. The body 22 of the blade is cylindrical in form and slidably fits, snugly, in a drilled passage 23 formed adjacent the periphery of the cutter body near the leading end of one of the cutter wing portions, as shown in Fig. 4, and the outer end of the blade body is countersunk as at 24 to provide a seat for the tip 21. The tip 21 is firmly inserted in the seat 24 and is suitably secured permanently.

In the form shown, the blade body 22 has a length of only about one-half the thickness of the cutter body 1 and is provided with an upwardly projecting shank or stem 25 of reduced diameter, which extends above the top surface of the cutter body and terminates in a threaded portion having a slotted end to receive a screw driver blade. A bushing 26 is mounted on the stem 25 and seated against the upper end of the body 22; and a nut 27, threaded onto the upper end of the stem, securely clamps the bushing and blade body together so that they may function as a unit. The bushing 26 is externally threaded and the upper end of the passage 23, in the cutter body, is threaded to receive the bushing. Thus the blade-bushing assembly is adjustable axially, in the passage 23, to vary the amount of projection of the tip 21 beyond the working face of the cutter body 1. The position of the bushing in the passage 23 is secured by a lock nut 28, threaded over the portion of the bushing extending above the cutter body and bearing against the upper face of the same.

As shown, the larger, cylindrical portion of the blade body 22 is provided with a relatively wide circumferential groove 29, located about midway between its ends, to provide a seat for a socket type set screw 30 which is threaded into and extends through a lateral passage 31 formed in the cutter body and extending into the axial passage 23.

Preferably the wing of the cutter body, in which the cylindrical blade is mounted, is cut away as at 32 and the passage 31 is substantially tangential to the cutter body at the axis of the passage 23, opening into the cut-away portion so that the outer end of the set screw 30, and its lock nut 33, will not project radially beyond the periphery of the cutter body. The purpose of the set screw 30 is to lock the blade in the position to which it is set and assure that it will not rotate when in operation. Also the groove 29 is wider than the inner tip of the set screw 30 to permit vertical adjustment of the blade for varying the depth of its cut.

As shown, the axis of the passage 23, and the cutter blade 22—25, is inclined forwardly relative to a radial plane through the axis of the cutter body 1, as indicated at A in Fig. 5. In this manner only the leading edge of the face of the cutting tip 21 engages the work, the tip normally moving in the direction of the arrow 34 in Fig. 5, thus providing a relatively narrow cut and a minimum of tip area to become heated. Also this permits rapid discharge of the narrow chips that are formed during the cut and prevents clogging of the cutting tip.

Figure 6:
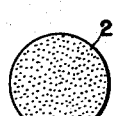
Figs. 6, 7 and 8 are end views showing various contour forms for an adjustable cutter blade.
Figure 7:
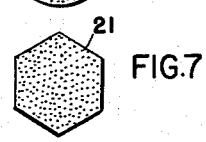
Figure 8:
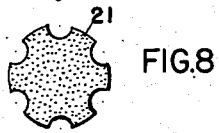

The end of the cutting tip 21 is made square to the axis of the cutter blade body 22 and the outline of the periphery, or cutting margin of the tip, may be annular, polygonal, or otherwise, so as to provide a multiplicity of cutting edges as indicated in Figs. 6, 7 and 8. Thus, when the edge in use becomes worn, a new cutting edge can be put into operation by merely loosening the lock nut 27, turning the shank 25 by means of a screw driver and then tightening the lock nut 27. If desired, the blade may be indexed, as by flats formed in the groove 29, so that the cutting edge of the tip will always be properly located when the set screw 30 is tightened, this being done prior to setting of the lock nut 27. This feature is of particular advantage because it permits change or replacement of a cutting edge without removing the blade from the cutter body and without disturbing the axial adjustment for depth of cut.

As shown in Fig. 5, the end of the cutting tip 21 is hollowed as at 35 to minimize blade drag and the side surface of the tip body is tapered inwardly and upwardly to provide an efficient rake. The cutting tip 21 normally makes a relatively narrow cut; however, because of the high speed of rotation of the cutter, the finished surface of the milled piece is extremely smooth and flat even though the rate of cutter feed is relatively high. Thus, in combination with the fly cutters 13.1, the improved adjustable blade will permit a single pass milling cut that will leave a substantially perfect finished surface.

Lubrication of the adjustable blade is had in the same manner as in the case of the fixed blades heretofore described, a passage 36, leading through the cutter body from the undercut portion of the channel 5 to the working face of the cutter directly in advance of the blade 21, being provided to conduct the lubricant and a porous plug 37 being disposed at the discharge end of the passage to regulate the rate of flow.

The radial openings 38 in the cutter body, as shown in the drawings, are for the insertion of a suitable tool to tighten the cutter body on the spindle on which the cutter is mounted when in use.

The main advantages of the improved cutter construction reside in the arrangement of the cutter blades whereby a single milling pass of the cutter head will produce a finished milled surface having a high degree of flatness; and in the simple construction of the cutter and in the arrangement whereby a radial cutting blade and a fly-cutter blade are incorporated in a single high speed cutter body or head. Other advantages reside in the form and construction of the improved adjustable cutter blade which performs the finishing cut; its ease of adjustment; and in the arrangement for renewing the cutting edge without removal of the blade from the cutter body. Still further advantages are to be found in the improved blade combination in a single cutter body, whereby a single pass milling operation will leave a finely finished surface in both shallow and deep cuts.

Although but two specific embodiments of this invention are herein shown and described, it will be understood that numerous details of the constructions shown may be altered or omitted without departing from the spirit of the invention as defined by the following claims.

I claim:

1. A milling cutter comprising a disc-like body having a central opening for mounting the cutter on a rotatable spindle, and a plurality of peripherally mounted cutting blades extending axially across the body and projecting beyond the working end face thereof, one of said blades being a radial cutting blade having cutting edges substantially normal to each other for making a radial and a rough face milling cut, another of said blades being a fly cutter projecting axially beyond the first-mentioned blade and having a cutting edge lying in a plane normal to the axis of said body, and the peripheral contour of said body between said blades curving inwardly and rearwardly along a substantially involute path.

2. A milling cutter comprising a disc-like body having a central opening for mounting the body on a rotatable spindle and a pair of cutting blades extending axially with respect to said body and projecting beyond the working face thereof, one of said blades being mounted in an axially extending seat on the periphery of said body, and the other blade comprising an elongate member extending axially through said body adjacent its margin and terminating in a cutting tip having a peripheral cutting edge contour substantially symmetrical about its central axis in a plane normal thereto.

3. A milling cutter comprising a disc-like body having a central opening for mounting the body on a rotatable spindle and a pair of cutting blades extending axially with respect to said body and projecting beyond the working face thereof, one of said blades being mounted in an axially extending seat on the periphery of said body, and the other blade comprising an elongate member extending axially through said body adjacent its margin and terminating in a cutting tip having a peripheral cutting edge contour substantially symmetrical about its central axis in a plane normal thereto, said elongate member having its axis inclined upwardly from the working face of said body in the direction of rotation thereof.

4. A milling cutter comprising a disc-like body having a central opening for mounting the body on a rotatable spindle and a pair of cutting blades extending axially with respect to said body and projecting beyond the working face thereof, one of said blades being disposed on the periphery of said body, and the other blade comprising an elongate member extending axially through said body adjacent its margin and terminating in a cutting tip having a peripheral cutting edge contour substantially symmetrical about its central axis in a plane normal thereto, said elongate member being shiftable on its axis in said body and having its axis inclined upwardly from its cutting tip in the direction of rotation of said body, and means to lock said member in fixed position relative to said body.

5. In a milling cutter comprising a disc-like body having an axial opening for mounting the body on a rotatable spindle, a cutting blade comprising an elongated member extending through a marginal portion of said body in the direction of its axis of rotation and projecting beyond the working surface thereof, said blade terminating in a cutting tip having a peripheral cutting edge contour substantially symmetrical about the blade axis and lying in a plane normal thereto, and said blade being rotatable on its axis, and means to lock said blade in fixed position in said body.

6. A milling cutter blade comprising a cylindrical body portion terminating at one end in a cutting tip, said cutting tip having a peripheral cutting edge contour substantially symmetrical about the axis of the body portion and lying in a plane normal thereto, a cylindrical shank integral on and extending axially from the other end of said body portion, an externally threaded sleeve fitted over said shank and adapted for mounting said blade in a rotatable cutter, said shank being rotatable in said sleeve, and releasable means on said shank to lock the same in fixed relation to said sleeve.

References Cited in the file of this patent

UNITED STATES PATENTS

| Number | Name | Date |
|---|---|---|
| 1,376,438 | Huther | May 3, 1921 |
| 1,460,030 | Mattson | June 26, 1923 |
| 1,945,854 | Hall | Feb. 6, 1934 |
| 2,348,089 | Niekirk | May 2, 1944 |
| 2,430,844 | Colwell | Nov. 11, 1947 |
| 2,524,232 | Onsrud | Oct. 3, 1950 |
| 2,561,470 | Hadley et al. | July 24, 1951 |

FOREIGN PATENTS

| Number | Country | Date |
|---|---|---|
| 1,200 | Great Britain | Mar. 10, 1894 |
| 680,231 | Germany | Aug. 24, 1939 |

OTHER REFERENCES

Metal Cutting Data, vol. 3, No. 5, M-4, pgs. 13 and 14, Nov. 1947.